United States Patent Office 3,494,813
Patented Feb. 10, 1970

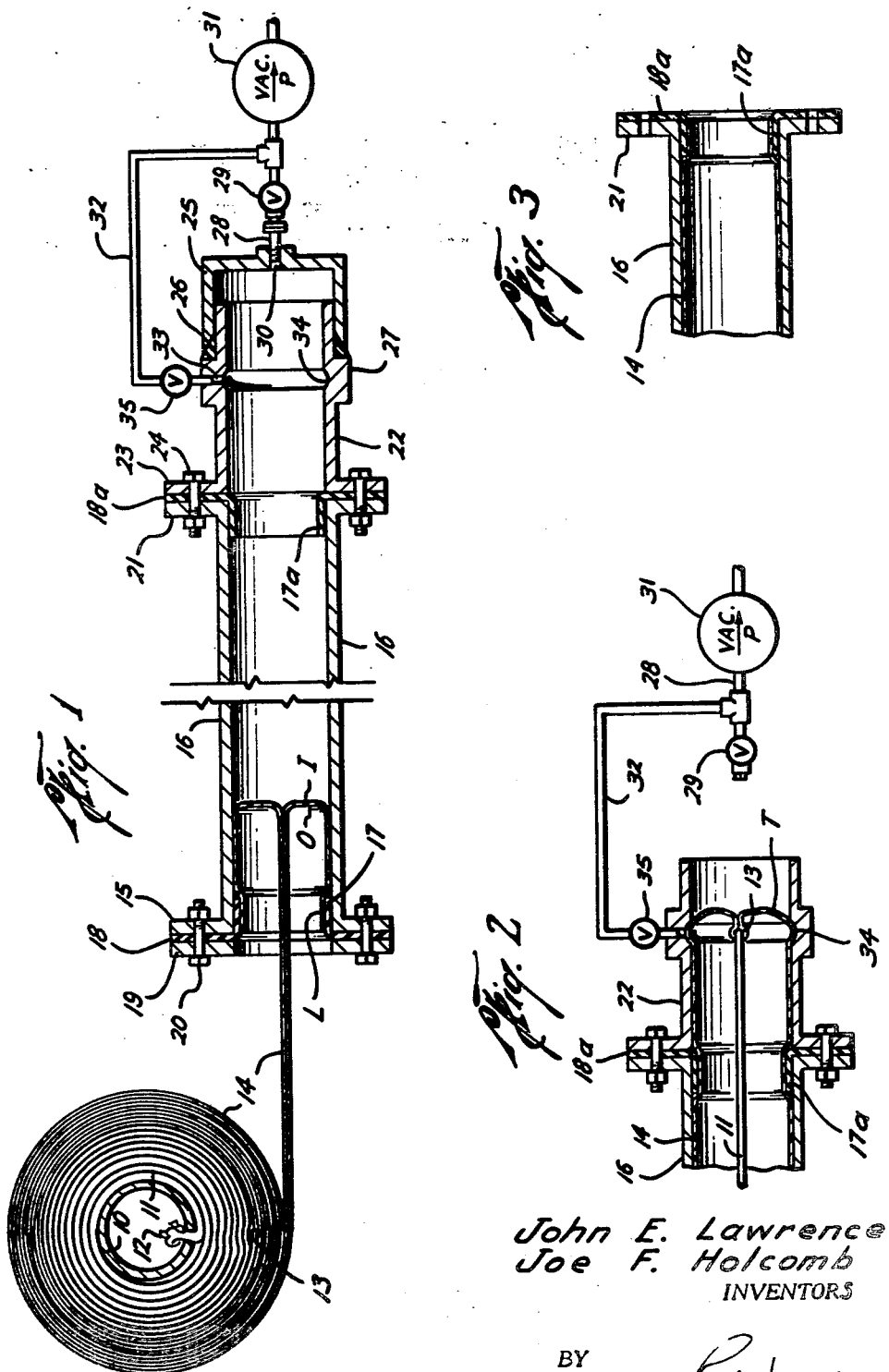

3,494,813
METHOD OF LINING A PIPE USING FLUID PRESSURE IN THE FORM OF A VACUUM
John E. Lawrence, 306 Monticello Drive, Odessa, Tex. 79760, and Joe F. Holcomb, P.O. Box 697, Snyder, Tex. 79549
Filed Nov. 8, 1965, Ser. No. 506,729
Int. Cl. B29c *17/00;* B32b *31/00*
U.S. Cl. 156—287                                    6 Claims

ABSTRACT OF THE DISCLOSURE

A method for installing a plastic liner in a pipe or the like, employing vacuum to draw the liner into the pipe and to assure tight sealing engagement between the liner and the pipe wall.

---

This invention relates to a method for installing a plastic liner in a pipe or the like.

In many instances, fluid-carrying pipe lines or other conduits are subject to corrosion and other conditions which are detrimental to the life of the conduit, or to the fluids flowing therethrough. Plastic inserts have heretofore been installed in such conduits for protective purposes but generally involve rather cumbersome and difficult procedures for effectively installing such liners, and particularly in sealing them to the wall of the conduit. The difficulties are increased where long pipe sections are involved.

The present invention has for its principal object the provision of a novel method for rapidly and efficiently installing a flexible plastic liner in a metal pipe line or other conduit.

A principal object is the provision of a method of inserting a flexible plastic liner in a conduit employing a vacuum to draw the liner into the conduit and to assure tight sealing engagement between the liner and the conduit wall.

Generally stated and in accordance with one embodiment of this invention, the method comprises, sealing one end of a flexible tubular plastic liner to an end of a pipe to be lined thereby, applying vacuum at the opposite end of the pipe sufficient to cause the liner to be sucked into the bore of the conduit, the application of the vacuum producing a pressure differential across the wall of the liner such as to force the liner to be compressed tightly against the wall of the pipe as the liner moves through the bore of the pipe. With the leading end of the liner sealed about the inlet end of the pipe, the vacuum being applied through the other end of the pipe will cause the liner to turn inside out as it is sucked through the pipe. The liner, ordinarily in the form of a continuous tube of the proper diameter, will initially be in a collapsed or flat folded form which may be stored on a cylindrical reel or in folded layers in a container, from which it may be unrolled or pulled as it is drawn into the bore of the conduit by the suction. The trailing end of the liner will be closed and may be connected to a rope or cable likewise spooled on a reel, which may be the same reel on which the liner is spooled, or may be suitably attached to the trailing end of the folded liner. Tension may be applied to the rope, either directly or through braking action on the storage reel, to regulate the speed at which the liner is permitted to be drawn into the conduit. The tail rope may also be employed to withdraw the liner from the pipe, if desired or necessary for any reason.

By the method in accordance with this invention, conduit sections of any length may be lined with a protective plastic liner quickly and efficiently in a continuous operation.

Other and more specific objects and advantages of this invention will become more readily apparent from the following detailed description when read in conjunction with the accompanying drawing which illustrates a preferred embodiment in accordance with this invention.

In the drawing:

FIG. 1 is a longitudinal, partly sectional, partly diagrammatic view of one embodiment of an apparatus for performing the method of this invention and illustrating an early stage in the lining operation;

FIG. 2 is a fragmentary view illustrating a finishing stage in the opposition; and FIG. 3 is a fragmentary view of an end of the lined pipe at completion of the lining operation.

Referring to the drawing, there is shown a reel hub 10 about which is spooled a tail rope or cable 11, having its trailing end attached at 12 to the reel hub. The length of the tail rope will be made somewhat greater than the length of the pipe section to be lined, and will have its leading end attached at 13 to the trailing end of the plastic insert or liner 14.

Liner 14 may be constructed of any of the well known flexible thermo-plastic materials suitable for the particular service, including the various well known polyethylene, vinyl, and acrylic materials, as well as synthetic rubbers, and the like. The liner thickness will likewise be selected to meet the service requirements in each case.

Liner 14 will normally be available in the form of a tube which, for purposes of transportation and storage and handling, will be in a flat collapsed form which can be readily spooled on reel 10. The leading end of the liner will be turned inside out and secured in any suitable manner to the rearward end 15 of a pipe section 16. In the embodiment illustrated in the drawing, the rearward end is shown as a conventional annular bolt flange connected to the end of the pipe in any conventional manner. The reversably turned leading end L of the liner may be secured directly to the end of the conduit section, or, as illustrated, may be secured to flange 15 by inserting it into the bore of a collar 17 constructed of a suitable plastic material and provided with a radially outwardly extending flange 18 adapted to be bolted between end flange 15 and a companion flange 19 by means of bolts 20. The leading end L of the liner may be heat sealed or otherwise effectively secured to the bore of collar 17, so as to form an air-tight connection therewith. Flange 18 of the collar will also serve as a gasket between flanges 15 and 19 to provide an air-tight seal to prevent entrance of air between the liner and the pipe. The opposite end of pipe 16, which may be of any desired or convenient length, is provided with a bolt flange 21 to which is bolted a tubular vacuum head 22 carrying a flange 23 mating with flange 21. A second collar 17a, identical with that in the forward end of the pipe and having the radially extending flange 18a, is mounted between flanges 21 and 23 and tightly secured therebetween by means of the bolts 24. Collar 17a is adapted to receive the trailing end of the liner, as will be described subsequently.

Vacuum head 22 has its outer end closed by a removable cap 25 which is slidably disposed over the outer end of the vacuum head and an annular seal packing 26 is disposed between the forward end of cap 25 and an annular shoulder 27 formed on the exterior of head 22. A pipe 28, fitted with a valve 29, communicates with the interior of cap 25 through a passageway 30 and is connected at the opposite end to a vacuum pump 31 by means of which a suction may be applied to the interior of pipe 16. A branch pipe 32 connects into pipe 28 between valve 29 and pump 31 and communicates with a passageway 33 extending through the wall of vacuum head 22 inwardly of cap 25 into communication with an annular recess 34, arcuate in cross-section, formed in the inner wall of head 22. A valve 35 is mounted in branch pipe 32 for purposes which will appear subsequently.

With the leading end L of the liner secured to collar 17, vacuum pump 31 will be operated to apply suction to the interior of pipe 16. Since the trailing end of liner 14 will be closed at or adjacent to the point of connection of tail rope 11, liner 14 will form a closure wall across the bore of pipe 16 when the leading end has been turned inside out and secured to collar 17, as illustrated. As the pressure inside pipe 16 is reduced by the vacuum pump, a differential pressure will be created across the wall of liner 14 with the atmospheric pressure operating on the outer side, indicated at O, and the reduced pressure on the inner wall at I. This differential pressure will be made as great as desired, depending upon the capacity of the vacuum pump and will generally be in the order of from 10 to 14 p.s.i. With such a differential pressure, it will be seen that the external pressure will act on the exterior of liner 14 and in conjunction with the suction applied by the vacuum pump, will cause the liner to be sucked and pushed rapidly into and through the bore of pipe 16. As the liner is thus moved through the pipe it will unreel from hub 10 in accordance with the rate at which the liner is moved through the pipe. Due to the large pressure differential across the liner created in the manner described, a large force will be acting on the liner, tending to move it through the pipe and will at the same time be acting against the internal peripheral surface of the liner, pushing it tightly against the bore wall of pipe 16. These pressure forces will, of course, depend upon the pressure differential and areas involved.

When the liner has been drawn entirely through pipe 16, its trailing end will pass through collar 17a into vacuum head 22 and past recess 34. Due to the pressure forces, the trailing end T of the liner will be sucked into recess 34, as seen in FIG. 2, and will be tightly sealed therein. Valve 29 may now be closed and the connection in pipe 28 between cap 25 and valve 29 will be broken which, while relieving vacuum applied to the outer end of the vacuum head, will continue to maintain a vacuum through conduit 32, valve 35 being now open. The vacuum thus will be exerted through recess 34 to hold the trailing end of the liner in place. Cap 25 will then be removed from the end of the vacuum head whereupon the end of the liner to which tail rope 11 is attached, will be cut away to a point adjacent the outer end of recess 34. This will keep the end of the liner sealed in groove 34. Thereupon, an operator, with suitable equipment, may reach into the bore of the liner and heat-seal or otherwise sealingly secure the end thereof to collar 17a. When this operation has been completed, vacuum head 22 will be disconnected and removed. The end of the liner can then be trimmed about the outer end of collar 17a, thereby finishing off the connection to the end of pipe 16, as shown in FIG. 3.

With the tail rope connected to the trailing end of the liner, means is provided for pulling the liner back out of the pipe, should any condition arise which renders the lining operation unsatisfactory. Such retraction may occur in any stage of the operations and may be carried out by simply reversing the rotation of reel 10 to re-spool the line and the attached liner. The tail rope may also serve to regulate the speed at which the liner is sucked into the pipe by applying braking force to the reel to hold back against the forces tending to suck the liner into pipe 16.

It will be readily seen that instead of the flanged connections for attaching the ends of the liner to the pipe, other means may be employed for this purpose. The leading end L of the liner, for example, may itself be turned out over the face of flange 15 and clamped between the latter and companion flange 19. Or in some cases, it will be possible to simply cement leading end L of the liner to the bore wall 16 by the use of an adhesive sufficiently strong to hold the vacuum forces which will be exerted between the liner and the pipe wall. Similar connections may be made between the trailing end of the liner and the forward end of the pipe.

The method herein described may be employed for lining pipe of any length and of any diameter, from diameter ranging from 2″ to 30″, or more, and in lengths from that of a 20 foot pipe section to a mile or more used as a unit.

One very useful application of this invention is in lining pipe lines, such as oil and gas pipe lines, before the lines are laid in the ground or in a lining pipe lines which have become pitted or subjected to corrosion in service, and it is desired to introduce a protective coating therein. In such cases, the present invention will prove most effective because of the pressure sealing action produced by the great pressure forces which will have been applied to force the liner against the pipe wall. Since sealing both ends of the pipe will be accomplished while the pressure differential exist, this sealing acting will be maintained and will assure continuous protection for the pipe wall.

As indicated previously, the liners employed may be selected which are chemically inert to fluids passing through the pipe line and which might otherwise be contaminated by contact with the material constituting the pipe well.

It will be evident that various modifications may be made in the procedures employed in the lining of pipe in accordance with this invention within the scope of the appended claims but without departing from the spirit of the invention.

What we claim and desire to secure by Letters Patent is:
1. The method of installing a plastic liner in a conduit section, comprising the steps of:
  (a) sealingly securing a leading end of a tubular plastic liner to the inlet end of the conduit section, said liner having its trailing end closed,
  (b) applying suction through the outlet end of the conduit section to create a pressure differential across said liner sufficient to cause the liner to be forced through the bore of said conduit toward the outlet end thereof, and
  (c) sealingly securing the trailing end of said liner to the wall of said pipe while maintaining said pressure differential.
2. The method according to claim 1, in which said leading end of said liner is reversed upon itself whereby the bore wall thereof is disposed in sealing relation to said conduit section and the liner is caused to turn inside out as it moves through said conduit section.
3. The method according to claim 1, including the further step of applying a braking force to the trailing end of the liner to regulate the rate of insertion of the liner into the conduit section.
4. In the method according to claim 1, the step of feeding said liner in flat collapsed form from a storage member to said conduit section.
5. In the method according to claim 1, inserting plastic collars in the ends of the conduit section to sealingly receive the corresponding ends of said liner.
6. The method according to claim 1, wherein said liner is constructed of a thermo-plastic material.

References Cited

UNITED STATES PATENTS

| | | | |
|---|---|---|---|
| 2,794,758 | 6/1957 | Harper et al. | 156—294 XR |
| 3,168,092 | 2/1965 | Silverman | 128—1.2 |
| 3,202,562 | 8/1965 | Lang et al. | 156—294 |
| 3,230,129 | 1/1966 | Kelly | 156—287 |

FOREIGN PATENTS 989,847   4/1965   Great Britain.

JOHN T. GOOLKASIAN, Primary Examiner

H. F. EPSTEIN, Assistant Examiner

U.S. Cl. X.R.

138—141, 146, 147; 156—294; 264—90